(12) United States Patent  
Bonebright et al.

(10) Patent No.: US 7,083,753 B2  
(45) Date of Patent: Aug. 1, 2006

(54) HONEYCOMB CORE COMPOSITE ARTICLE AND METHOD AND APPARATUS FOR MAKING SAME

(75) Inventors: Pat Bonebright, San Diego, CA (US); John Marks, Escondido, CA (US)

(73) Assignee: Composite Optics, Inc., San Diego, CA (US)

( * ) Notice: Subject to any disclaimer, the term of this patent is extended or adjusted under 35 U.S.C. 154(b) by 187 days.

(21) Appl. No.: 10/737,687

(22) Filed: Dec. 16, 2003

(65) Prior Publication Data

US 2004/0219330 A1 Nov. 4, 2004

Related U.S. Application Data

(60) Provisional application No. 60/434,316, filed on Dec. 17, 2002.

(51) Int. Cl.
*B29C 70/30* (2006.01)
*B29D 24/00* (2006.01)

(52) U.S. Cl. ............... 264/214; 264/236; 264/238; 264/257; 264/258; 264/278; 264/324

(58) Field of Classification Search ........ 264/154–156, 264/257–258, 324, 236, 238, 278
See application file for complete search history.

(56) References Cited

U.S. PATENT DOCUMENTS

| 5,730,920 A | 3/1998 | Marshall et al. |
| 5,981,025 A | 11/1999 | Marshall et al. |
| 6,830,718 B1 * | 12/2004 | Maumus et al. ............... 264/82 |

* cited by examiner

*Primary Examiner*—Stefan Staicovici
(74) *Attorney, Agent, or Firm*—Michael Blaine Brooks, P.C.; Michael B. Brooks; Bruce Anderson (57) ABSTRACT

A method is provided that uses half-period translations, ply-upon-pin repositions, and shape-maintaining pins with a bolster plate, with insertable nodal heating elements that provide heat at their rectangular ends and when driven under pressure against opposing pins with rectangular faces cure portions of a pre-impregnated fabric to make honeycomb core composite articles.

15 Claims, 8 Drawing Sheets

HONEYCOMB CORE COMPOSITE ARTICLE AND METHOD AND APPARATUS FOR MAKING SAME

CROSS REFERENCE TO RELATED APPLICATION

This application claims the benefit of U.S. provisional applications 60/434,316, filed on Dec. 17, 2002, entitled "Honeycomb Core Composite Article and Method and Apparatus for Making Same," the contents of which are hereby incorporated herein by reference.

FIELD OF THE INVENTION

This invention relates to processes of manufacturing lightweight structural cores and their resulting products and in particular to methods of manufacturing honeycomb cores and their resulting products.

BACKGROUND

Composite articles incorporating honeycomb cores are commonly used for fabricating aerospace structures due to their advantageous strength to weight ratio. Honeycomb core composite articles are typically comprised of upper and lower composite skins or layers, i.e., fiber reinforced resin matrix laminates that are separated and stabilized by the honeycomb core. Due to the high bending stiffness and compressive strength properties of honeycomb cores composite articles, i.e., the honeycomb core functions as a shear web and spaces the composite skins from the bending neutral axis, honeycomb core composite articles have particular utility in aerospace applications such as aircraft fuselage panels and door structures. The high strength and low weight of such construction results in lower overall aircraft system weight.

For example, in commercial aircraft, nearly all of the movable control surfaces, wing and tail leading and trailing edge fixed surfaces, doors, and interior cabin structures employ panels formed of honeycomb cores. Although more expensive than simple structures, the honeycomb core panel possess equal strength at higher stiffness, lower weight, and is resistant to higher natural vibration frequencies. Such resistance is very important when structural elements are employed in close proximity to jet and rocket engines. Moreover, the honeycomb core must have small enough cell sizes to provide stabilization of the facings against premature buckling. In addition, the core must be sufficiently tough and abuse resistant to enable the same to be easily handled in a fabrication shop.

The honeycomb core panel possesses equal strength at higher stiffness, lower weight, and is resistant to higher natural vibration frequencies. Such resistance is very important when structural elements are employed in close proximity to jet and rocket engines. Such structural panels generally comprise inner and outer composite skins, which are formed from materials such as Aluminum or composite materials such as fiberglass, graphite, embedded in a resinous matrix, e.g., epoxy, having a honeycomb core material interposed therebetween. Fiber can also be constructed of any other materials having a very small diameter and high strength and stiffness. Resins may typically consist of an epoxy, polycyanate, bismaleimide, and the like. The strength and stiffness of the resin matrix also affects the strength of the finished composite structure. For example, stronger resins such as epoxies usually yield a higher strength composite structure than lower strength resins such as polyester.

Where high damage tolerance and abuse resistance are requires, Aramid honeycombs are employed. For example, KEVLAR® fiber can be used advantageously for this purpose. KEVLAR® is a registered trademark of E. I. du Pont de Nemours & Co., Wilmington, Del. for an aromatic polyamide fiber of high tensile strength. Besides weight and strength, KEVLAR® has a slightly negative axial coefficient of thermal expansion similar to graphite, which means KEVLAR® laminates can be made thermally stable. Unlike graphite, KEVLAR® is very resistant to impact and abrasion damage and can be used as a protective layer on graphite laminates.

SUMMARY

The preferred process embodiment of the present invention results in a honeycomb composite core article. The preferred fabric material can be any thermo set polymer impegnated fabric. In one aspect, the fabric can be KEVLAR® fabric. In other embodiments, the prepreg fabric can be a unidirectional fabric or it may comprise multiple plies of uncured unidirectional material. The fabric or layer of material may be a sheet of resin impregnated felt, a sheet of stitched unidirectional fabric, a sheet of chopped-fiber reinforced molding material or a sheet of unreinforced sheet molding compound.

The uncured material is aligned into a bolster plate. The fabric is articulated under, and held in place by rectangular parallelepiped pins secured by hooks or other fastening means. The bolster plate applies heating elements, preferably consisting of resistive electric heating strips mounted on the top of an insulating material inserted into slots in the bolster plate, against portions of the fabric, giving the fabric shape and preparing it for node bonding. The heating element supports, in conjunction with the rectangular pins, are also used to concentrate pressure at the nodes. The bolster plate with fabric and rectangular pins is inserted into a press. The press drives the bolster plate and fabric nodal surfaces into the node surfaces of the honeycomb article in-progress, where the node surfaces are supported by previously enclosed pins. The heating elements are used, for the first ply, to cure the pre-impregnated material at each of its nodes or, for subsequent plies, to co-cure the pre-impregnated material at each of its nodes with the previously cured honeycomb layer. Once curing conditions are met, pressure is released, the bolster plate is withdrawn, the previously enclosed pins are removed, and the above steps are repeated cyclically, with appropriate translation of cured surface material at each cycle, until a desired height of the honeycomb core is produced.

The process maintains any fabric orientation bias from −45/+45 degrees for high shear stiffness to a simple 0/90 degree orientation designed for good compression properties. The forming pins, having right rectangular faces, provide for high and even bond pressure during the cure cycle. The fabric and resulting product are co-cured one ply at a time, thereby eliminating bond preparation, minimizing processing time, and allowing for the build up of a core to a desired height. The freestanding post-cure process allows for heat-forming, if required.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
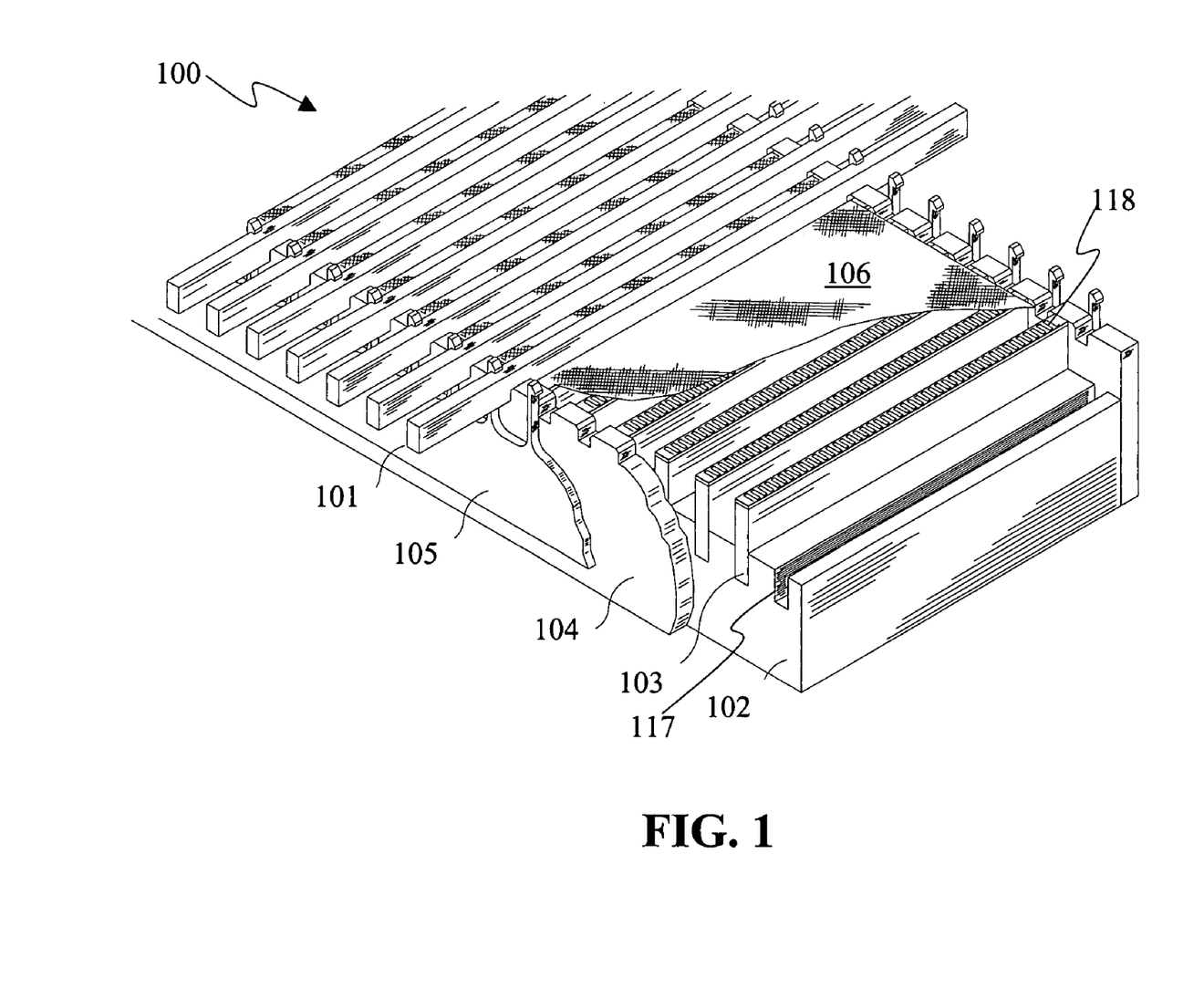
FIG. 1 illustrates a first ply of fabric drawn over the bolster plate and its groove-mounted heating elements.
Figure 2:
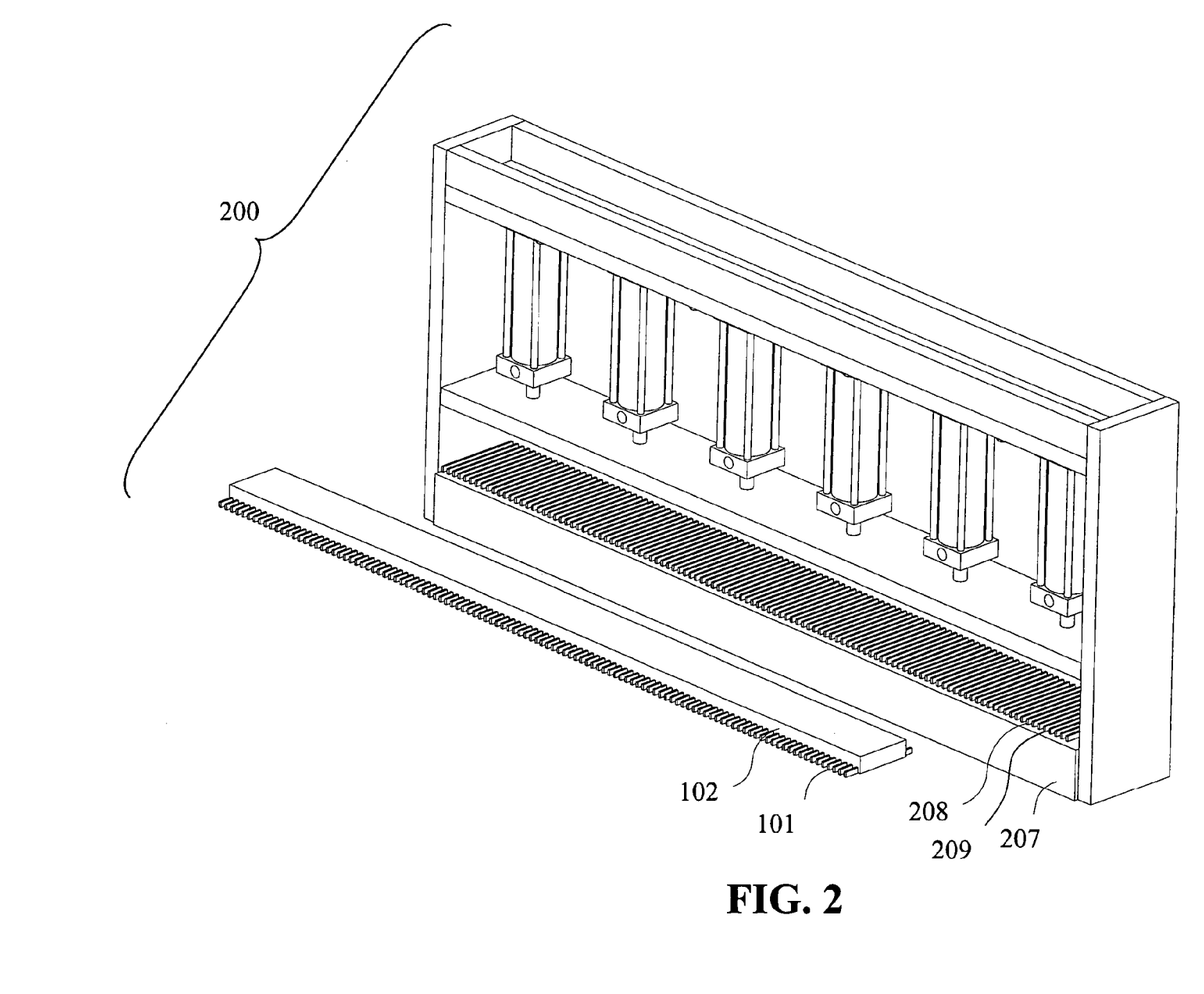
FIG. 2 illustrates the bolster plate with the first ply of fabric and pins being inserted into the press.

FIG. 1 illustrates an embodiment of the present invention, the first par being a bolster table 100 including a bolster plate 102 with a ply of material 106 that has been applied across heating elements 103 and held in position by bolster plate pins 101 which are in turn held in place by grooves 104 and hooks and 105. The heating elements 103 are mounted in grooves 117 of the bolster plate 102. The top portion of an individual heating element 103 preferably includes an electric strip heater 118 mounted atop a compliant insulating layer, preferably of 90 durometer silicone rubber. The bolster plate is preferably made of steel. The pins 101 of the several embodiments of the present invention are preferably stainless steel rectangular parallelepipeds. Other pins providing a rectangular contact surface and able to withstand the heat and pressure required are also acceptable. FIG. 2 illustrates an apparatus 200 having the bolster plate 102 with fabric and bolster plate pins 101 being placed into the press 207. Heating elements 103 in the bolster plate are aligned with a set of fixture pins 208 in a grooved alignment fixture 209 in the press 207.

Figure 3:
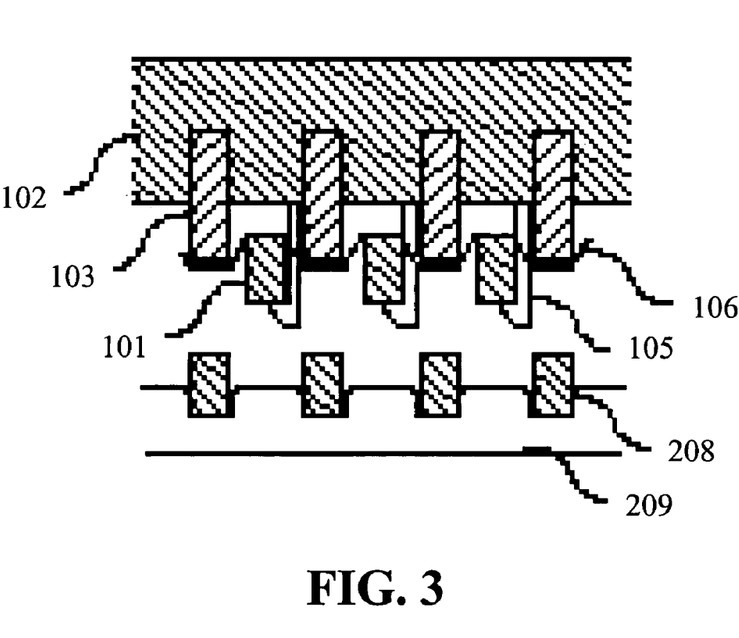
FIG. 3 illustrates in cross-section the alignment with the fixture pins.

FIG. 3 illustrates the bolster plate 102 with fabric 106 and bolster plate pins 101 aligned with the fixture pins 208 in the grooved alignment fixture 209 in the press 207 where the heating elements 103 provide heat and concentrate pressure during each nodal cure cycle.

Figure 4:
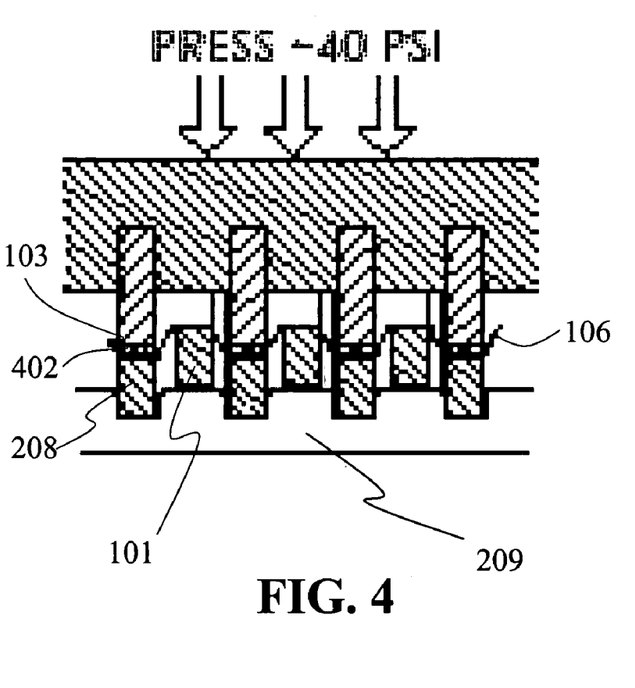
FIG. 4 illustrates in cross-section the pressing and heating of the first ply.

FIG. 4 illustrates the node curing of the first ply 106. The press 107 is adjusted to apply the appropriate amount of pressure at the contact surfaces, or nodes, of the fabric between each fixture pin 208 and each heating element 103. Once each portion of the ply 401 between the fixture pin 208 and heating element 103 (i.e., the node 402) has been pressed and heated a sufficient time for the node 402 to be cured, the electric strip heater 118 are switched off, and the press 207 is retracted. The bolster plate pins 101 are then removed. Many fabrics are applicable to the ply or plies of the several embodiments of the present invention. The prepreg fabric can be one or more plies of uncured unidirectional material and preferably the fabric is KEVLAR® or a similar aromatic polyamide fiber of high tensile strength. In addition, the fabric may be a sheet of resin impregnated felt, a sheet of stitched unidirectional fabric, a sheet of chopped-fiber reinforced molding material or a sheet of unreinforced sheet molding compound.

Figure 5:
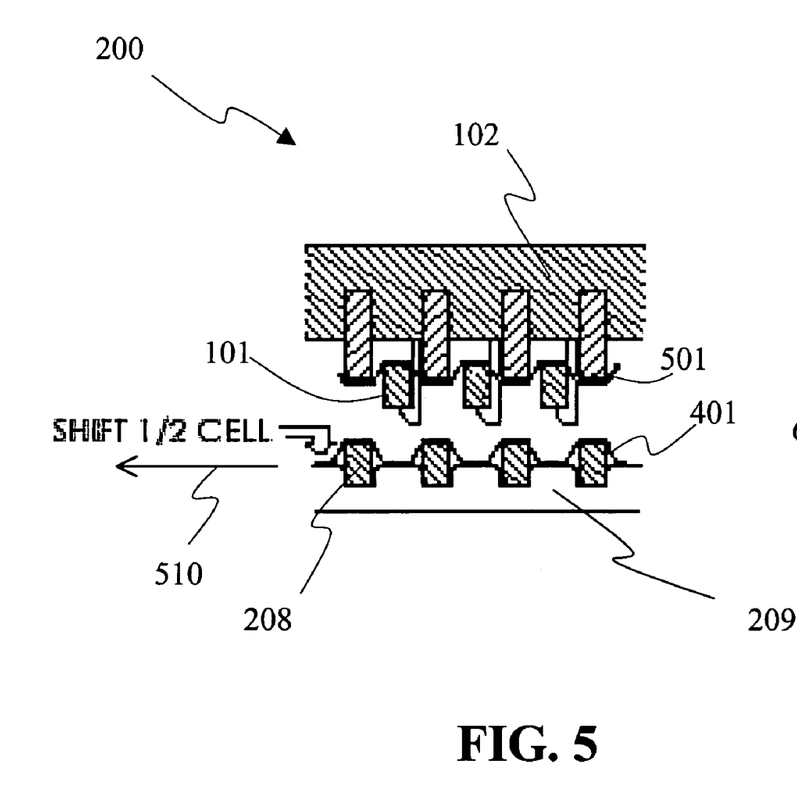
FIG. 5 illustrates in cross-section the translation and repositioning of the first ply and the alignment of the second ply.

FIG. 5 illustrates the newly formed ply 401 being shifted laterally 510 the distance of one-half cell, before being reinserted into the apparatus 200 on top of the fixture pins 208. The bolster plate 102 is removed and prepared for the next ply. The second ply 501 is aligned into the bolster plate 102 in a manner as done with the initial alignment of the first ply and then the second ply 501 is held in position by the reinserted bolster plate pins 101. The bolster plate 102 is reinserted into the press 207.

Figure 6:
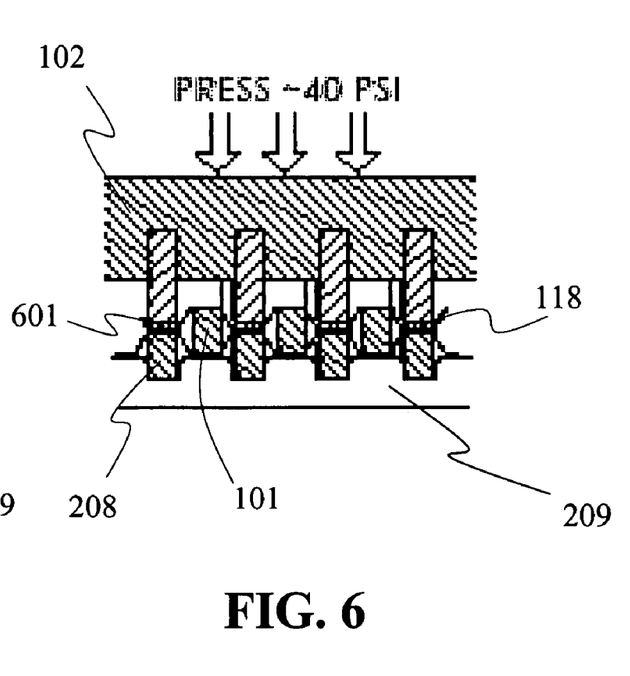
FIG. 6 illustrates in cross-section the second ply being co-cured with the first ply.

FIG. 6 illustrates the co-curing of the first ply 401 and the second ply 501. Pressure (e.g., 40 pounds per square inch) generated by the press 207 and heat from electric strip heater elements 118 are applied to the top surface and bottom surface of each of the nodes 601, thereby curing the nodes 601.

Figure 7:
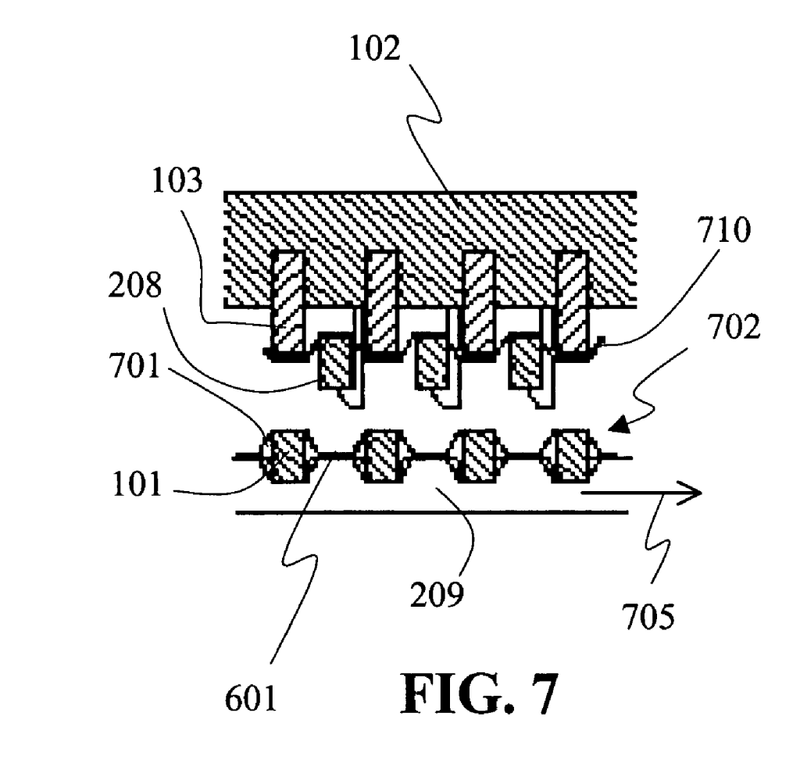
FIG. 7 illustrates in cross-section the translated first and second plies and the alignment of the third ply.
Figure 8:
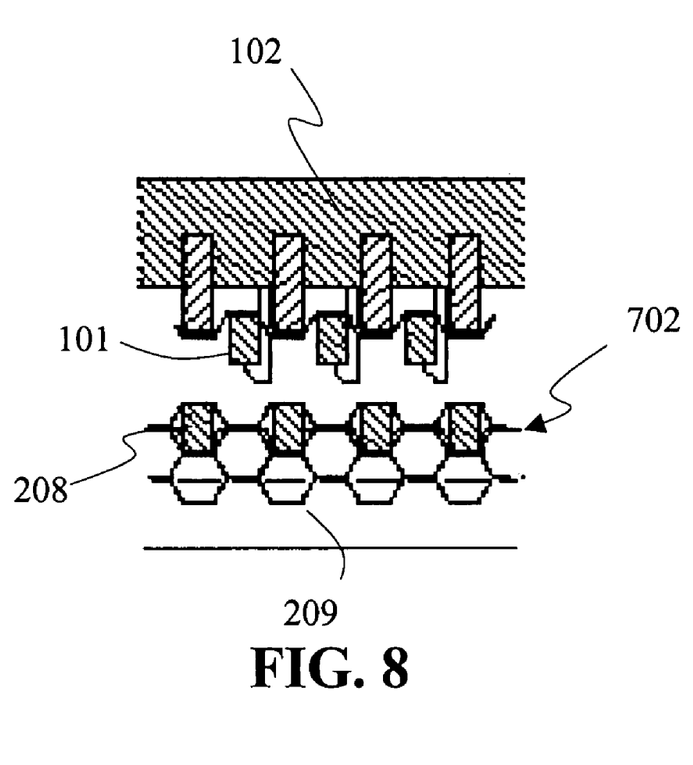
FIG. 8 illustrates in cross-section the iterative properties of the process and apparatus.

FIG. 7 illustrates that once the nodes 601 are cured, the fixture pins 208 at the cured surfaces are removed. The bolster plate pins 101, enclosed by each of the resulting cells 701, are kept in place. The entire honeycomb core 702 with bolster plate pins 101 is shifted laterally 705 one-half cell, i.e., one-half of a corrugation period, and realigned into the grooved fixture 209 of the press 207. The first set of bolster plate pins 101 now function as a second set of fixture pins 101 for the next iteration of ply application. The bolster plate 102 is removed and the next ply of material 710 is applied to the bolster plate 102 and the next ply of material 710 is held in place by the first set of fixture pins 208 now functioning as a second set of bolster plate pins 208. The bolster plate 102 is placed into the press 207 where pressure and heat by way of the heating elements 103 and the first set of bolster plate pins 101, now functioning as a second set of fixture pins 101, are applied at the nodal surfaces of the core 702 and the next ply of material 710. The second set of fixture pins 101 are removed and the entire core 702 translated one-half of a corrugation cycle in a core-centering direction 710 with the second set of bolster plate pins 208 enclosed by the resulting cells of the second layer 501 and the third layer 710 and with the second set of bolster plate pins 208 aligned with a respective heating element 103. The second set of bolster plate pins 208 now function as the first set of fixture pins 208 and the second set of fixture pins 101 now function as bolster plate pins 101. Thereafter, the cycle repeats until a core 702 desired core height is achieved (FIG. 8). Once the core has reached the desired height, pins are removed and the core is placed in an oven for final curing.

Figure 9A:
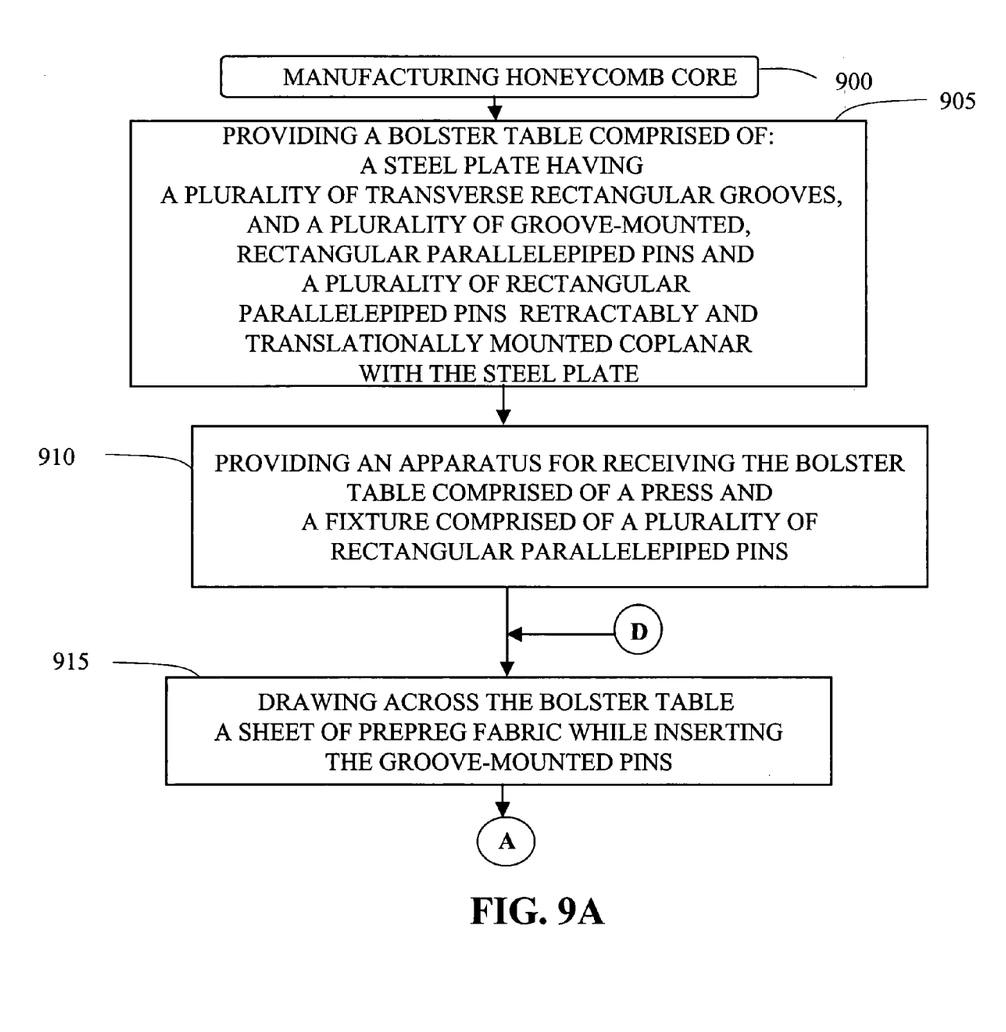
FIG. 9A is a partial flowchart of the preferred method.
Figure 9B:
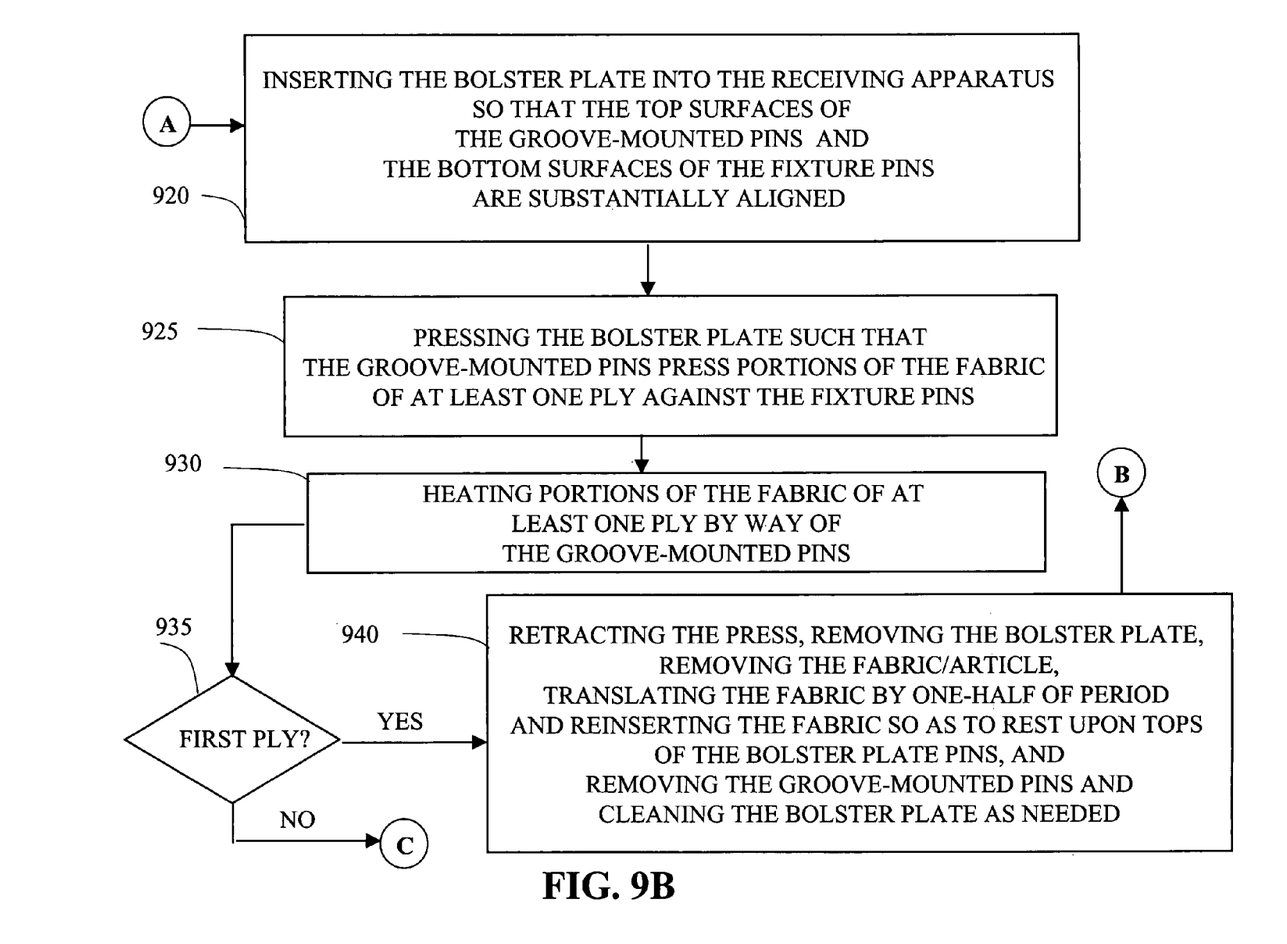
FIG. 9B is a partial flowchart of the preferred method.
Figure 9C:
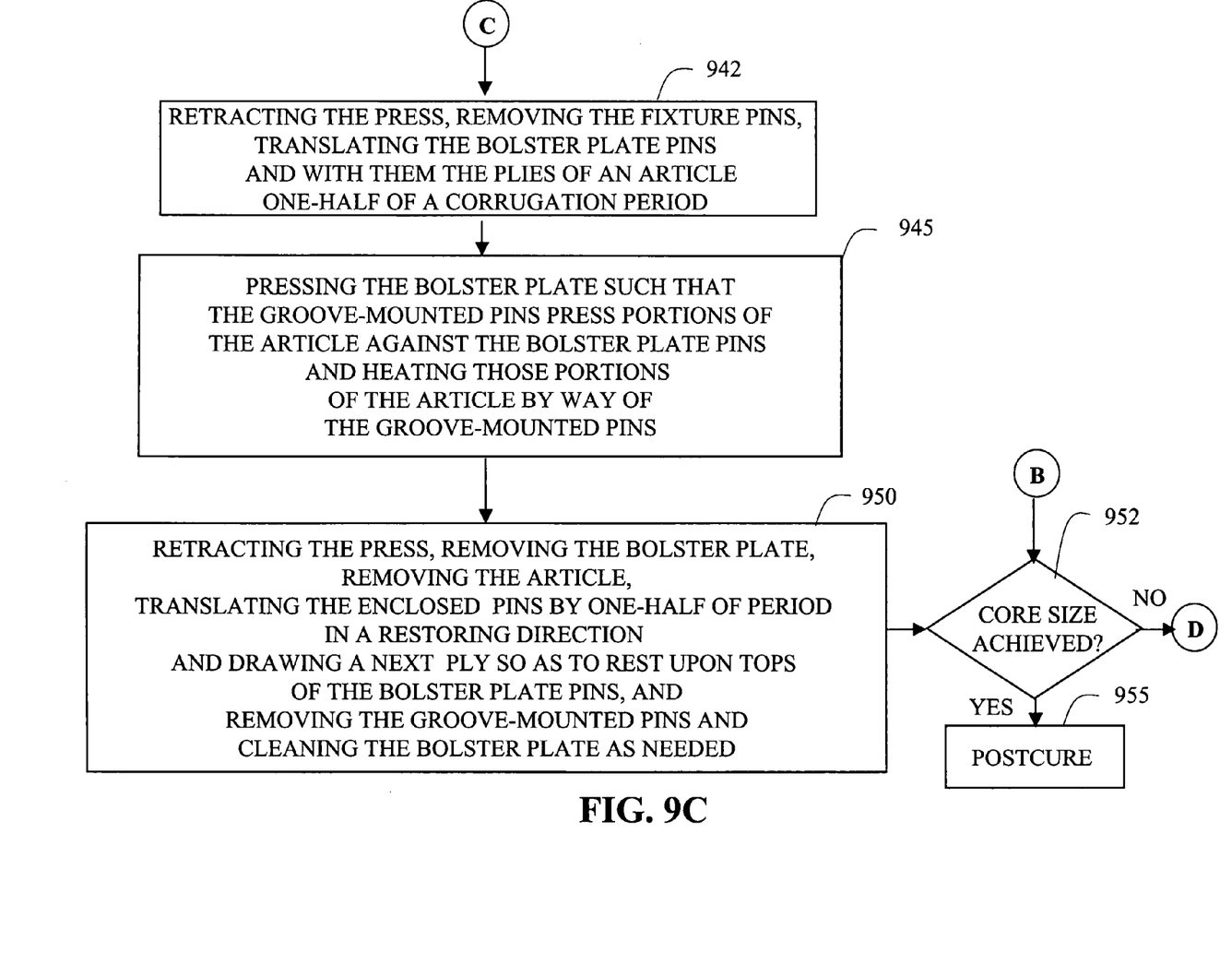
FIG. 9C is a partial flowchart of the preferred method.

The above process is disclosed in flowchart form in FIGS. 9A, 9B and 9C. The flowchart of FIG. 9A illustrates that the process begins 905 with providing a bolster table 100 including a steel plate 102 having a plurality of transverse rectangular grooves 117 and a plurality of groove-mounted pins 101, preferably rectangular parallelepipeds, retractably and translationally mounted coplanar with the bolster plate 102 and providing an apparatus for receiving the bolster table 100 including a press 207 and a fixture 209 comprising a plurality of pins 208 that are preferably rectangular parallelepipeds 910. The process continues 915 with drawing a sheet of prepregnated fabric 106 across the bolster plate 102 having heating elements. Then the flowchart of FIG. 9B illustrates that the process continues with the inserting the bolster plate 102 into the receiving press 207 so that the top surfaces of the heating elements 103 and the bottom surfaces of the fixture pins 208 are substantially aligned 920. Next, the bolster plate 102 is pressed so that the heating elements 103 press portions of the fabric of at least one ply 106 against the fixture pins 925. Next 930, portions of the fabric of at least one ply 106 are heated by the heating elements 103. Then 935, if this is the first ply, the press 207 is retracted, the bolster plate 102 removed, the fabric 106 is removed and translated by one-half of a corrugation period and reinserted into the bolster table 100 so as to rest upon the tops of the bolster plate pins 101, optionally removing the heating elements 103, and cleaning the bolster plate as needed 940. If this is not the first ply 935, then the flowchart of FIG. 9C illustrates that the press 207 is retracted 942, the bolster plate pins 101 are removed, the fixture pins 208 are translated one-half of a corrugation period and with them the plies of the article thus formed 702. Next 945 the bolster plate 102 is pressed such that the hating elements 103 press portions of the article 702 against the first set of bolster plate pins 101, now functioning as a second set of fixture pins, and heating those portions of the article by way of the heating elements 103. Next, the press 207 is retracted, the bolster plate 102 and the fixture pins 208, now functioning as a second set of bolster pins 208, are removed, and the bolster plate pins 101, i.e., the second set of fixture pins 101, are translated by one-half of a corrugation period in a restoring direction, and a third ply is inserted into the bolster table 100 so as to rest upon the tops of the fixture pins 208, i.e., the second set of bolster plate pins 208, and thereafter the heating elements are optionally removed and the bolster plate is cleaned as needed 950. The process iterates 952 until a desired core size 720 is achieved. Thereafter, the article 720 is removed from the apparatus and post-cured 955.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A method of manufacturing a honeycomb core comprising the steps of:
   providing a bolster table comprising a plate having a plurality of transverse grooves, a plurality of resistive heating elements each having a top surface and a bottom surface, the top surface of each of the resistive heating elements mounted in said plurality of transverse grooves;
   providing an apparatus for receiving the bolster plate, the apparatus comprising a press, a first plurality of fixture pins each having a top surface and a bottom surface and a fixture comprising a plurality of grooves to receive the bottom surfaces of each of the first plurality of fixture pins;
   repeating the following steps until a core of desired height is achieved:
      drawing across the bolster table a layer of material while inserting a first plurality of bolster plate pins, the first plurality of bolster plate pins being attached to the bolster table via fastening means;
      inserting the bolster table into the receiving apparatus so that the bottom surfaces of each of the plurality of resistive heating elements and the top surfaces of each of the first plurality of fixture pins are substantially aligned;
      pressing, by the receiving apparatus, the bolster plate such that the plurality of heating elements press portions of the layer of material against the fixture pins; and
      heating portions of the layer of material by way of the resistive heating elements;
   when the layer of material is a first ply, then performing the steps comprising:
      retracting the press;
      removing the bolster plate;
      translating the layer of material by one-half cell;
      reinserting the layer of material so as to rest upon top surfaces of each the fixture pins; and
   when the layer of material is an even ply, then performing the steps comprising:
      retracting the press;
      removing the first plurality of fixture pins;
      translating the first plurality of bolster plate pins, which now function as a second plurality of fixture pins, and, with the second plurality of fixture pins, the plies of material, one-half of a corrugated cell;
      drawing across the bolster table a layer of material while inserting the first plurality of fixture pins, which now function as a second plurality of bolster plate pins, the second plurality of bolster plate pins being attached to the bolster table via fastening means; and
      pressing the bolster plate such that the groove-mounted heating elements press portions of the layer of material against the at least one previously pressed layer of material supported by the second plurality of fixture pins; and
   when the layer of material is an odd and not first ply, then performing the steps comprising:
      retracting the press;
      removing the second plurality of fixture pins;
      translating the second plurality of bolster plate pins, which now function as the first plurality of fixture pins, and, with the first plurality of fixture pins, the plies of material, one-half of a corrugated cell;
      drawing across the bolster table a layer of material while inserting the second plurality of fixture pins, which now function as the first plurality of bolster plate pins, the first plurality of bolster pins being attached to the bolster table via fastening means; and
      pressing the bolster plate such that the groove-mounted heating elements press portions of the layer of material against the at least two previously pressed layer of material supported by the first plurality of fixture pins;
   whereby the core of desired height is fabricated for post-curing.

2. The method as claimed in claim 1 wherein the transverse grooves are rectangular.

3. The method as claimed in claim 1 wherein the press is pneumatic.

4. The method as claimed in claim 1 wherein the first plurality of fixture pins is rectangular parallelepiped.

5. The method as claimed in claim 1 wherein the first plurality of bolster plate pins is rectangular parallelepiped.

6. The method as claimed in claim 1 further comprising the step of post-curing.

7. The method as claimed in claim 1 wherein the fastening means for attaching the first plurality of bolster plate pins to the bolster table is hooks.

8. The method as claimed in claim 1 wherein the material of the layer of material and successive layer of material is an aromatic polyamide fiber of high tensile strength.

9. The method as claimed in claim 1 wherein the material of the layer of material and successive layer of material is a prepreg fabric.

10. The method as claimed in claim 9 wherein the prepreg fabric is unidirectional fabric.

11. The method as claimed in claim 9 wherein the prepreg fabric comprises multiple plies of uncured unidirectional material.

12. The method as claimed in claim 9 wherein the prepreg fabric is a sheet of resin impregnated felt.

13. The method as claimed in claim 9 wherein the prepreg fabric is a sheet of stitched unidirectional fabric.

14. The method as claimed in claim 6 wherein the material of the layer of material and of the successive layer of material is a sheet of chopped-fiber reinforced molding material.

15. The method as claimed in claim 6 wherein the fabric is a sheet of unreinforced sheet molding compound.

* * * * *

UNITED STATES PATENT AND TRADEMARK OFFICE
CERTIFICATE OF CORRECTION

PATENT NO. : 7,083,753 B2
APPLICATION NO. : 10/737687
DATED : August 1, 2006
INVENTOR(S) : Pat Bonebright et al.

It is certified that error appears in the above-identified patent and that said Letters Patent is hereby corrected as shown below:

Column 1, Line 34
    replace "honeycomb" with --Honeycomb--

Column 1, Line 43
    replace "panel" with --panels--

Column 1, Line 45
    replace "is" with --are--

Column 1, Line 51
    replace "abuse resistant" with --abuse-resistant--

Column 1, Line 59
    replace "Aluminum" with --aluminum--

Column 1, Line 62
    replace "Fiber" with --Fibers--

Column 1, Line 66
    replace "affects" with --affect--

Column 2, Line 4
    replace "Aramid" with --aramid--

Column 2, Line 9
    add the work "fiber" after KEVLAR®

Column 2, Line 11
    add the work "fiber" after KEVLAR®

Column 2, Line 12
    add the work "fiber" after KEVLAR®

Column 2, Line 21
    replace "impegnated" with --impregnated--

Column 3, Line 29
    replace "par" with --part--

Column 3, Line 33
    delete the word "and"

UNITED STATES PATENT AND TRADEMARK OFFICE
CERTIFICATE OF CORRECTION

PATENT NO. : 7,083,753 B2
APPLICATION NO. : 10/737687
DATED : August 1, 2006
INVENTOR(S) : Pat Bonebright et al.

It is certified that error appears in the above-identified patent and that said Letters Patent is hereby corrected as shown below:

Column 3, Line 54
   replace "107" with --207--

Column 3, Line 57
   replace "401" with --106--

Column 3, Line 60
   replace "heater" with --heaters--

Column 4, Line 31
   delete reference number "208"

Column 4, Line 35
   delete reference number "101"

Column 4, Line 37
   replace "are" with --is--

Column 4, Line 39
   delete reference number "710"

Column 4, Line 43
   replace "function" with --functions--

Column 4, Line 45
   replace "function" with --functions--

Column 4, Line 62
   delete the word "the"

Column 5, Line 14
   replace "hating" with --heating--

Column 5, Line 28
   replace "720" with --702--

Column 5, Line 29
   replace "720" with --702--

UNITED STATES PATENT AND TRADEMARK OFFICE
CERTIFICATE OF CORRECTION

PATENT NO. : 7,083,753 B2
APPLICATION NO. : 10/737687
DATED : August 1, 2006
INVENTOR(S) : Pat Bonebright et al.

It is certified that error appears in the above-identified patent and that said Letters Patent is hereby corrected as shown below:

Column 3, Line 42

"...FIG. 2.."

Should begin a new paragraph with all of its subsequent text following it.

Signed and Sealed this

Twenty-fourth Day of October, 2006

JON W. DUDAS
*Director of the United States Patent and Trademark Office*